United States Patent
Iga et al.

(10) Patent No.: US 11,926,763 B2
(45) Date of Patent: Mar. 12, 2024

(54) HOLLOW RESIN PARTICLES AND SHEET

(71) Applicant: ZEON CORPORATION, Tokyo (JP)

(72) Inventors: Takashi Iga, Tokyo (JP); Takeshi Hirata, Tokyo (JP); Nozomi Yabuki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 841 days.

(21) Appl. No.: 16/981,775

(22) PCT Filed: Mar. 25, 2019

(86) PCT No.: PCT/JP2019/012530
§ 371 (c)(1),
(2) Date: Sep. 17, 2020

(87) PCT Pub. No.: WO2019/188996
PCT Pub. Date: Oct. 3, 2019

(65) Prior Publication Data
US 2021/0002497 A1  Jan. 7, 2021

(30) Foreign Application Priority Data
Mar. 30, 2018 (JP) ................. 2018-070262

(51) Int. Cl.
C09D 7/65 (2018.01)
B41M 5/44 (2006.01)
C08F 22/14 (2006.01)
C09D 7/40 (2018.01)

(52) U.S. Cl.
CPC ............... C09D 7/65 (2018.01); B41M 5/44 (2013.01); C08F 22/14 (2013.01); C09D 7/68 (2018.01); C09D 7/69 (2018.01)

(58) Field of Classification Search
None
See application file for complete search history.

(56) References Cited

U.S. PATENT DOCUMENTS

| | | | |
|---|---|---|---|
| 4,798,691 A | 1/1989 | Kasai et al. | |
| 2004/0034147 A1 | 2/2004 | Zama | |
| 2009/0087662 A1 | 4/2009 | Yoshitani et al. | |
| 2018/0186960 A1 | 7/2018 | Hyogo et al. | |

FOREIGN PATENT DOCUMENTS

| | | | | |
|---|---|---|---|---|
| EP | 1629989 A2 | 3/2006 | | |
| EP | 3246171 A1 | 11/2017 | | |
| JP | S61-87734 A | 5/1986 | | |
| JP | H02-140272 A | 5/1990 | | |
| JP | H02-255704 A | 10/1990 | | |
| JP | 11208114 A | * 8/1999 | ............ | B41M 5/26 |
| JP | 2004202770 A | * 7/2004 | ............ | B41M 5/26 |
| JP | 2005-054084 A | 3/2005 | | |
| JP | 2008006752 A | * 1/2008 | ............ | B41M 5/382 |
| JP | 2008-231241 A | 10/2008 | | |
| JP | 2008-291165 A | 12/2008 | | |
| JP | 4448930 B2 | 4/2010 | | |
| JP | 2010-123348 A | 6/2010 | | |
| JP | 2010-185064 A | 8/2010 | | |
| JP | 2011-068774 A | 4/2011 | | |
| JP | 2013-239246 A | 11/2013 | | |
| JP | 5727962 B2 | 6/2015 | | |
| JP | 2016-190980 A | 11/2016 | | |
| JP | 6152237 B2 | 6/2017 | | |
| JP | 2017165890 A | * 9/2017 | ............ | C08F 20/20 |
| WO | 2017/062538 A1 | 4/2017 | | |
| WO | 2019/026899 A1 | 2/2019 | | |

OTHER PUBLICATIONS

Machine translation of JP-2008006752-A (no date).*
Machine translation of JP-11208114-A (no date).*
Machine translation of JP-2004202770-A (no date).*
Machine translation of JP-2017165890-A (no date).*
Extended European Search Report dated Nov. 19, 2021, issued in counterpart EP Application No. 19774234.9. (9 pages).
Notification of Transmittal of Translation of the International Preliminary Report on Patentability (Form PCT/IB/338) issued in counterpart International Application No. PCT/JP2019/012530 dated Oct. 15, 2020 with Forms PCT/IB/373 and PCT/ISA/237. (15 pages).
Office Action dated Oct. 7, 2022, issued in counterpart EP Application 19 774 234.9. (3 pages).
Office Action dated Aug. 31, 2022, issued in counterpart EP application No. 19774234.9. (203 pages).
Extended (Supplementary)European Search Report dated Aug. 8, 2023, issued in counterpart to EP Application No. 23186970.2. (9 pages).

* cited by examiner

Primary Examiner — Michael J Feely
(74) Attorney, Agent, or Firm — WHDA, LLP

(57) ABSTRACT

Provided is hollow resin particles having higher compressive strength and more excellent heat insulating properties and heat resistance than before. The hollow resin particles each having one or two or more hollow portions, wherein a number average particle diameter is from 0.1 μm to 9.0 μm, a void ratio is from 70% to 99%, and an amount of the volatile organic compound contained is 5% by mass or less.

12 Claims, 5 Drawing Sheets

HOLLOW RESIN PARTICLES AND SHEET

TECHNICAL FIELD

The present disclosure relates to hollow resin particles having higher compressive strength and more excellent heat insulating properties and heat resistance than before, and a sheet comprising the hollow resin particles.

BACKGROUND ART

Hollow resin particles can scatter light well and can reduce light transmissivity as compared to resin particles having practically no voids in their interiors; hence, hollow resin particles are widely used in the applications of, for example, aqueous coating materials and paper coating compositions, as organic pigments and masking agents excellent in optical properties such as opacity and whiteness.

Meanwhile, in the applications of, for example, aqueous coating materials and paper coating compositions, an increase in the void ratio of a contained hollow resin particle is desired in order to improve effects such as the weight reduction, acquisition of heat insulating properties, and opacification of, for example, coating materials and paper coating compositions. However, in conventionally known production methods, it has been difficult to produce hollow resin particles having high void ratio and excellent heat resistance while controlling a particle diameter.

For example, Patent Literature 1 discloses a method of producing a thermally expandable minute sphere comprising, as essential components, an outer shell comprising a thermoplastic resin and a blowing agent included in the outer shell. The literature mentions that thermally expandable minute spheres each having a prescribed average particle diameter can be produced stably with good yield without degrading expansion ability.

Further, Patent Literature 2 discloses that hollow resin particles were obtained by a method in which, when producing hollow resin particles, (1) a dispersion phase containing a vinyl monomer not having a nitrile group, a phase separation accelerator, a volatile solvent, a polymerization initiator, and a reaction catalyst was prepared, (2) a continuous phase containing a solvent and a surfactant was prepared, (3) the dispersion phase was added to the continuous phase and then the obtained mixture was stirred, (4) the obtained water dispersion was subjected to polymerization reaction under a pressurized condition, (5) the mixture after polymerization reaction was depressurized at a temperature more than or equal to the boiling point of the volatile solvent and thereby a water-based dispersion was obtained, and (6) the obtained water-based dispersion was filtered and dried. The literature mentions that, since the resin contained in the shell of the hollow resin particle comprises a vinyl monomer not having a nitrile group, a nitrile group is not eliminated even at high temperature and the strength of the shell is less likely to be reduced.

Patent 3 discloses a method of producing hollow polymer particles by polymerizing a dispersion containing a hydrophilic monomer, a crosslinkable monomer, and another monomer together with an oily substance and then removing the oily substance in particles in liquid or in a gaseous atmosphere.

Patent Literature 4 discloses a method of producing hollow resin particles with a suppressed level of depressions by removing an organic solvent included in fine particles in a water medium to hollow the fine particles.

Patent Literature 5 discloses hollow high molecular fine particles with a high content ratio of a crosslinkable monomer.

CITATION LIST

Patent Literature

[Patent Literature 1] JP 6152237 B2
[Patent Literature 2] JP 2008-231241 A
[Patent Literature 3] JP S61(1986)-87734 A
[Patent Literature 4] JP 5727962 B2
[Patent Literature 5] JP 4448930 B2

SUMMARY OF INVENTION

Technical Problem

Patent Literature 1 mentions that a nitrile-based monomer is preferably contained as an essential component from the viewpoint of expansion ability. However, a resin particle containing a nitrile-based monomer is generally poor in heat resistance. Further, in the technology of Patent Literature 1, blowing with a blowing agent and thermal expansion reaction are utilized to expand a minute sphere, and hence there is a problem of difficulty in precise control of the particle diameter of the minute sphere.

Further, Patent Literature 2 mentions that, by performing depressurization at a temperature more than or equal to the boiling point of the volatile solvent, the resin is expanded by pressure at the time of the volatilization of the included volatile solvent, and a hollow resin particle is formed. However, since a particle is expanded by performing depressurization while giving heat to the particle, there is a problem that the particle diameters of obtained hollow resin particles are uneven.

The technology of Patent Literature 3 has a problem that, when it is attempted to make a hollow particle with a small shell thicknesses by increasing the amount of the oily substance, the particle is crushed when removing the oily substance because the strength of the shell is low, and a particle with a high void ratio is not obtained.

The hollow particle produced by the method described in Patent Literature 4 includes water, and the method has a problem that a step of removing the internal water is needed when the hollow particle is used in uses of, for example, heat insulating agents, and at this stage the particle is depressed and the void ratio is reduced.

In the case of the hollow high molecular fine particle described in Patent Literature 5, there is a problem of being difficult to remove an internal hydrocarbon solvent even when performing high-temperature and long-time treatment.

Hollow resin particles are each required to have, in addition to a high void ratio and excellent heat resistance described above, high compressive strength for maintaining the hollow portion of the particles. Further, hollow resin particles are also required, depending on the intended application of the hollow resin particles, to have excellent heat insulating properties by using a difficulty of conducting heat in the hollow portion.

An object of the present disclosure is to provide hollow resin particles having higher compressive strength and more excellent heat insulating properties and heat resistance than before, and a sheet comprising the hollow resin particles.

Solution to Problem

The present inventors focused attention on the best particle diameter of hollow resin particle to improve its compressive strength. Further, the present inventors closely examined necessary physical properties to obtain hollow resin particles having more excellent heat insulating properties and heat resistance than before. As a result, the present inventors have found out that hollow resin particles having a specified number average particle diameter, and each having a specified void ratio and an amount of the volatile organic compound, has high compressive strength, and have excellent heat insulating properties and heat resistance.

That is, hollow resin particles of the present disclosure are hollow resin particles each having one or two or more hollow portions, wherein a number average particle diameter is from 0.1 μm to 9.0 μm, a void ratio is from 70% to 99%, and an amount of the volatile organic compound contained is 5% by mass or less.

In the present disclosure, a repeating unit constituting the resin may contain a crosslinkable monomer unit.

In the present disclosure, with respect to 100 parts by mass of a total mass of the repeating unit constituting the resin, a content ratio of the crosslinkable monomer unit may be from 25 parts by mass to 59 parts by mass.

In the present disclosure, a repeating unit constituting the resin may contain a hydrophilic monomer unit.

In the present disclosure, a repeating unit constituting the resin may contain a crosslinkable monomer unit, and the crosslinkable monomer unit may contain at least one selected from the group consisting of a divinylbenzene monomer unit and an ethylene glycol dimethacrylate monomer unit.

In the present disclosure, the hydrophilic monomer unit may contain at least one selected from the group consisting of a carboxyl group-containing monomer unit and a hydroxyl group-containing monomer unit.

In the present disclosure, a repeating unit constituting the resin may contain a monovinyl monomer unit.

Hollow resin particles of the present disclosure may have a particle size distribution (a volume average particle diameter (Dv)/a number average particle diameter (Dn)) of from 1.1 to 2.5.

Hollow resin particles of the present disclosure may each comprise a shell, and shell thickness may be from 0.01 μm to 1.0 μm.

Hollow resin particles of the present disclosure may be hollow resin particles for a thermosensitive recording materials, the particles having the above-mentioned features.

Hollow resin particles of the present disclosure may be hollow resin particles for fillers, the particles having the above-mentioned features.

Hollow resin particles of the present disclosure may be hollow resin particles for coating materials, the particles having the above-mentioned features.

A sheet of the present disclosure comprises the hollow resin particles.

A sheet of the present disclosure may be a thermosensitive recording sheet comprising the hollow resin particles.

Advantageous Effects of Invention

According to the present disclosure as described above, since hollow resin particles have a specified number average particle diameter, and each have a specified void ratio and an amount of the volatile organic compound, the hollow resin particles can have high compressive strength and can exhibit excellent heat insulating properties and heat resistance.

DESCRIPTION OF EMBODIMENTS

Figure 1:
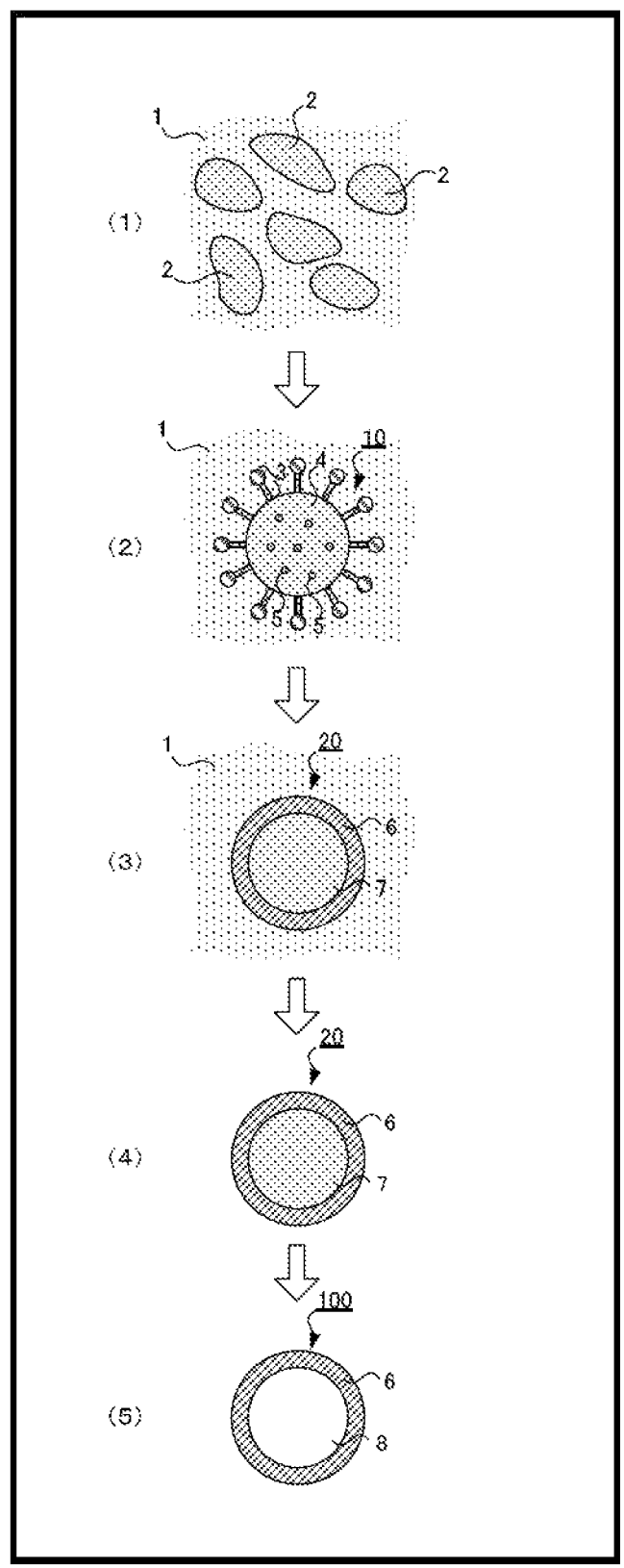
FIG. 1 is a schematic diagram showing an embodiment of the production method of the present disclosure.

Hereinbelow, in the present disclosure, "hollow" means a state where the presence of at least any one selected from the group consisting of a liquid portion, a gas portion, and a mixed portion of liquid and gas can be determined in the interior of a particle by an ordinary observation method. The "liquid portion" in the present disclosure means a continuous portion filled with liquid. The "gas portion" in the present disclosure means a continuous portion filled with gas. The "mixed portion of liquid and gas" in the present disclosure means a continuous portion filled with liquid and gas.

In the present disclosure, a "hollow portion" means a portion of the interior of a particle occupied by a hollow. Whether a particle has a hollow portion or not can be determined by, for example, SEM observation of a cross section of the relevant particle or TEM observation of the relevant particle as it is.

A resin shell of the particle may not have a communication hole, and the "hollow portion" in the present disclosure may be isolated from the outside of the particle by the shell of the particle.

A resin shell of the particle may have one or two or more communication holes, and the "hollow portion" in the present disclosure may communicate with the outside of the particle via the communication hole.

In the present disclosure, a "hollow resin particle precursor" means a particle of which the hollow portion is filled with water or a mixture of water and gas, or filled with an aqueous medium or a mixture of an aqueous medium and gas. In the present disclosure, a "precursor composition" means a composition containing a hollow resin particle precursor.

In the present disclosure, a "hollow resin particle" means a resin particle of which the hollow portion is filled with gas.

1. Hollow Resin Particle

Hollow resin particles of the present disclosure are hollow resin particles each having one or two or more hollow portions, wherein a number average particle diameter is from 0.1 μm to 9.0 μm, a void ratio is from 70% to 99%, and an amount of the volatile organic compound contained is 5% by mass or less.

As described above, the properties required of the hollow resin particles include high compressive strength and excellent heat insulating properties and heat resistance. To obtain these properties, the three physical property parameters of the hollow resin particles, that is, the number average particle diameter, void ratio and volatile organic compound amount of the hollow resin particles need to be within specific numerical value ranges. Hereinafter, the outline of the relationship between the three physical property parameters (the number average particle diameter, the void ratio and the volatile organic compound amount) and the three properties (the compressive strength, the heat insulating properties and the heat resistance) will be described.

The number average particle diameter of the hollow resin particles is a parameter relating to the compressive strength and heat resistance thereof. When the number average particle diameter of the hollow resin particles is sufficiently small, since the particles are less likely to be crushed than hollow resin particles with a large number average particle diameter, they have high compressive strength. When the number average particle diameter of the hollow resin particles is sufficiently small, since the surface area of the particles is also small, they are less likely to be influenced by an external environment. As a result, the hollow resin particles can exhibit excellent heat resistance.

Next, the void ratio of the hollow resin particle is a parameter relating to the heat insulating properties thereof. In general, the hollow portion of the hollow resin particle is less thermally conductive than the case where the resin is assumed to be present in the portion. Accordingly, as the void ratio increases, the ratio occupied by the hollow portion increases, and then, the hollow resin particle obtains excellent heat insulating properties.

Next, the amount of the volatile organic compound contained in the hollow resin particle is a parameter relating to the heat insulating properties and heat resistance thereof. In the present disclosure, "the volatile organic compound contained in the hollow resin particle" indicates, among the organic compounds contained in the hollow resin particle, an organic compound with a boiling point of 400° C. or less. As the volatile organic compound, typical examples include, but are not limited to, a hydrocarbon solvent used in the below-described production method and an unreacted monomer. When the amount of the volatile organic compound in the hollow resin particle is sufficiently small, the volatile organic compound is less likely to become a heating medium in the interior of the hollow resin particle, and the heat conducted to a part of the particle is less likely to be propagated to the whole of the particle. Accordingly, deterioration of the heat insulating properties is less likely to occur. Further, when the amount of the volatile organic compound in the interior of the hollow resin particle is sufficiently small, even if the hollow resin particle is exposed to a high temperature environment, the hollow resin particle is less likely to expand by volatilization of the volatile organic compound. Accordingly, deterioration of the heat resistance is less likely to occur.

As just described, the three physical property parameters (the number average particle diameter, the void ratio and the volatile organic compound amount) of the hollow resin particles have an influence on the three properties (the compressive strength, the heat insulating properties and the heat resistance).

Hereinafter, the details of the three physical property parameters (the number average particle diameter, the void ratio and the volatile organic compound amount) will be described in order.

The number average particle diameter of the hollow resin particles is generally from 0.1 µm to 9.0 µm, preferably from 0.2 µm to 8.0 µm, more preferably from 0.4 µm to 6.0 µm, still more preferably from 0.6 µm to 5.0 µm, and particularly preferably from 0.8 µm to 4.0 µm.

When the number average particle diameter of the hollow resin particles is 0.1 µm or more, since the heat is not likely to be conducted to the whole of the hollow resin particle, the hollow resin particles can exhibit excellent heat insulating properties. Further, when the number average particle diameter of the hollow resin particles is 9.0 µm or less, since the hollow resin particles are not likely to be crushed, the hollow resin particles have high compressive strength. Furthermore, when the number average particle diameter of the hollow resin particles is 9.0 µm or less, since the surface area of the hollow resin particle is sufficiently small, so that the hollow resin particles are not likely to be influenced by an external environment, therefore, the hollow resin particles can exhibit excellent heat resistance.

The particle size distribution (a volume average particle diameter (Dv)/a number average particle diameter (Dn)) of the hollow resin particles may be from 1.1 to 2.5, may be from 1.1 to 2.3, and may be from 1.1 to 2.0. When the particle size distribution is 2.5 or less, particles which have low dispersion in compressive strength characteristics and heat resistance among the particles can be obtained. Further, when the particle size distribution is 2.5 or less, for example, a product having uniform thickness can be produced when producing a product such as a sheet described later.

The volume average particle diameter (Dv) and the number average particle diameter (Dn) of the hollow resin particles can be found by, for example, using a laser diffraction particle size distribution measuring apparatus, measuring each particle diameter of the hollow resin particles and calculating the number average and the volume average of them, the obtained values can be the number average particle diameter (Dn) and the volume average particle diameter (Dv) of the particles, respectively. The particle size distribution is found by dividing the volume average particle diameter by the number average particle diameter.

The void ratio of the hollow resin particle is generally 70% or more, preferably 72% or more, more preferably 74% or more, still more preferably 78% or more, further more preferably 80% or more, and particularly preferably 82% or more. When the void ratio of the hollow resin particle is 70% or more, since the ratio occupied by the hollow portion is high, the hollow resin particle has excellent heat insulating properties. From the viewpoint of maintaining strength of the hollow resin particle, the void ratio of the hollow resin particle may be 99% or less, or may be 95% or less.

The void ratio of the hollow resin particle is calculated as follows. The apparent density $D_1$ was divided by the true density $D_0$. The resultant was multiplied by 100, and the value thus obtained was subtracted from 100, thereby obtaining the void ratio of the particle.

A method of measuring the apparent density $D_1$ of the hollow resin particle is as follows. First, approximately 30 cm³ of hollow resin particles are introduced into a measuring flask with a volume of 100 cm³, and the mass of the introduced hollow resin particles is precisely weighed. Next, the measuring flask in which the hollow resin particles are introduced is precisely filled with isopropanol up to the marked line while care is taken so that air bubbles do not get in. The mass of the isopropanol added to the measuring flask is precisely weighed, and the apparent density $D_1$ (g/cm³) of the hollow resin particle is calculated on the basis of Formula (I) below.

Apparent density $D_1$=[Mass of the hollow resin particles]/(100−[Mass of the isopropanol]÷[Specific gravity of isopropanol at the measuring temperature])     Formula (I)

The apparent density $D_1$ is equivalent to the specific gravity of the whole hollow resin particle in the case where the hollow portion is regarded as part of the hollow resin particle.

A method of measuring the true density $D_0$ of the hollow resin particle is as follows. Hollow resin particles are pulverized in advance; then, approximately 10 g of pulverized pieces of hollow resin particles are introduced into a measuring flask with a volume of 100 cm$^3$, and the mass of the introduced pulverized pieces is precisely weighed. After that, similarly to the measurement of the apparent density mentioned above, isopropanol is added to the measuring flask, the mass of the isopropanol is precisely weighed, and the true density $D_0$ (g/cm$^3$) of the hollow resin particle is calculated on the basis of Formula (II) below.

True density $D_0$=[Mass of the pulverized pieces of hollow resin particles]/(100−[Mass of the isopropanol]÷[specific gravity of isopropanol at the measuring temperature])   Formula (II)

The true density $D_0$ is equivalent to the specific gravity of the shell portion alone of the hollow resin particle. As is clear from the measurement method mentioned above, when calculating the true density $D_0$, the hollow portion is not regarded as a part of the hollow resin particle.

The void ratio of the hollow resin particle can be reworded as the ratio occupied by the hollow portion in the specific gravity of the hollow resin particle.

The amount of the volatile organic compound contained in the hollow resin particle of the present disclosure is generally 5% by mass or less, preferably 4% by mass or less, more preferably 3% by mass or less, still more preferably 2% by mass or less, furthermore preferably 1% by mass or less, and particularly preferably less than 1% by mass.

When the amount of the volatile organic compound contained in the hollow resin particle is 5% by mass or less, since the volatile organic compound is not likely to become a heating medium in the interior of the hollow resin particle, and the heat conducted to a part of the particle is not likely to be propagated to the whole of the particle, deterioration of heat insulating properties are not likely to occur. Further, when the amount of the volatile organic compound contained in the hollow resin particle is 5% by mass or less, even if the hollow resin particle is exposed to a high temperature environment, the hollow resin particle is not likely to expand by volatilization of the volatile organic compound, so that the deterioration of heat resistance and generating of odor are not likely to occur.

A method of measuring the amount of the volatile organic compound contained in the hollow resin particle is as follows. Approximately 100 mg of hollow resin particles are put into a 30 mL screw cap glass bottle, and are precisely weighed. Subsequently, approximately 10 g of tetrahydrofuran (THF) is put in, and is precisely weighed.

The mixture in the glass bottle is stirred for 1 hour with a stirrer, and the volatile organic compound contained in the hollow resin particles is extracted. The stirring is stopped, and the resin components of the hollow resin particles insoluble in THF are precipitated; then, a filter (manufactured by Advantec; product name: MEMBRANE FILTER 25JP020AN) is installed at a syringe barrel, and the precipitate is filtered out to obtain a sample liquid; and the sample liquid is injected into gas chromatography (GC) to be analyzed. The amount (% by mass) of the volatile organic compound per unit mass of the hollow resin particles is found from a peak area of GC and a working curve created in advance. Detailed analysis conditions are as follows.

(Analysis conditions)
Apparatus: GC-2010 (manufactured by Shimadzu Corporation)
Column: DB-5 (manufactured by Agilent Technologies Japan, Ltd.)
df=0.25 μm, 0.25 mm I.D.×30 m
Detector: FID
Carrier gas: nitrogen (linear velocity: 28.8 cm/sec)
Temperature of the injection port: 200° C.
Temperature of the detector: 250° C.
Temperature of the oven: raised from 40° C. to 230° C. at a rate of 10° C./minute, and held at 230° C. for 2 minutes
Amount of sampling: 2 μL The compressive strength of the hollow resin particle can be measured, for example, by the following method.

The 10% compressive strength of the particle is measured under the following test conditions, using a micro compression tester (such as MCTM-500 manufactured by Shimadzu Corporation, etc.)

(Test Conditions)
Indenter type: FLAT50
Object lens magnification: 50
Loading rate: 0.8924 mN/sec For example, when the compressive strength of the hollow resin particles is 5.0 MPa or more, depending on the intended application of the hollow resin particles, the hollow resin particles are evaluated to have high compressive strength.

The heat resistance and heat insulating properties of the hollow resin particles may be evaluated by using the hollow resin particles themselves, or by using a sheet produced by using the hollow resin particles. The evaluation of the heat resistance of the hollow resin particle using the sheet and the evaluation of the heat insulating properties thereof will be described later.

As long as the three physical property parameters (the number average particle diameter, the void ratio and the volatile organic compound amount) satisfy the above-described conditions, the type of the resin contained in the hollow resin particles and the type of the repeating unit constituting the resin are not particularly limited. Hereinafter, the resin contained in the hollow resin particles and the repeating unit thereof will be described.

A repeating unit constituting the resin contained in the hollow resin particle may contain a monovinyl monomer unit.

In the present disclosure, a monovinyl monomer means a compound having one polymerizable vinyl functional group, and a compound other than the hydrophilic monomer described later. A resin containing a monovinyl monomer unit is generated by polymerization of a monovinyl monomer. Incidentally, in the present disclosure, a "monovinyl monomer" does not include a "crosslinkable monomer" described later unless otherwise stated.

In the present disclosure, examples of the monovinyl monomer include an acrylic-based monovinyl monomer such as (meth)acrylate; an aromatic monovinyl monomer such as styrene, vinyltoluene and α-methylstyrene; and a mono-olefin monomer such as ethylene, propylene and butylene.

In the present disclosure, (meth)acrylate means a general term including acrylate and methacrylate. Examples of (meth)acrylate include methyl (meth)acrylate, ethyl (meth)acrylate, butyl (meth)acrylate, 2-ethylhexyl (meth)acrylate, lauryl (meth)acrylate, glycidyl (meth)acrylate and 2-hydroxyethyl (meth)acrylate. (Meth)acrylate may be used alone or in combination of two or more kinds.

Among the (meth)acrylate described above, preferably, at least one selected from the group consisting of butyl acrylate and methyl methacrylate is used.

Thus, by using a monomer which is resistant to relatively high temperature conditions such as (meth)acrylate, the heat resistance of the obtained hollow resin particle can be enhanced as compared to, for example, the case where a monomer having a nitrile group is used.

A repeating unit constituting the resin contained in the hollow resin particle may contain a hydrophilic monomer unit.

In the present disclosure, a hydrophilic monomer means a compound soluble in water, and more specifically means a compound having a solubility in water of 1 (unit: g/100 g-$H_2O$) or more. Using a hydrophilic monomer for the polymerization to obtain the resin is preferable particularly in terms of less aggregation of the obtained hollow resin particles.

The resin contained in the hollow resin particle may contain, as a hydrophilic monomer unit, for example, a carboxyl group-containing monomer unit, a hydroxyl group-containing monomer unit, an amide group-containing monomer unit or a polyoxyethylene group-containing monomer unit. Among these, it is preferable that the resin contains a carboxyl group-containing monomer unit, since particles with high heat resistance can be obtained. Further, the case where the resin contains a hydroxyl group-containing unit is preferable in the effect by use of the hydrophilic monomer, that is, using a hydrophilic monomer for polymerization to obtain the resin is preferable particularly in the effect of less aggregation of the obtained hollow resin particles.

Examples of the carboxyl group-containing monomer include a (meth)acrylic acid monomer, a maleic acid monomer, crotonic acid monomer, a cinnamic acid monomer, an itaconic acid monomer and a fumaric acid monomer. In the present disclosure, (meth)acrylic acid means a general term including acrylic acid and methacrylic acid.

In the case where a carboxyl group-containing monomer and (meth)acrylate are used in combination, a preferred mass ratio is carboxyl group-containing monomer:(meth)acrylate=100:0 to 10:90, a more preferred mass ratio is carboxyl group-containing monomer:(meth)acrylate=100:0 to 20:80, a still more preferred mass ratio is carboxyl group-containing monomer:(meth)acrylate=100:0 to 30:70, and a particularly preferred mass ratio is carboxyl group-containing monomer:(meth)acrylate=100:0 to 35:65.

When (meth) acrylic acid is used as a carboxyl group-containing monomer, a preferred mass ratio is the same as the above-mentioned preferred mass ratio. That is, in the case where (meth)acrylic acid and the above-mentioned (meth)acrylate are used in combination, a preferred mass ratio is (meth)acrylic acid:(meth)acrylate=100:0 to 10:90, a more preferred mass ratio is (meth)acrylic acid:(meth)acrylate=100:0 to 20:80, a still more preferred mass ratio is (meth)acrylic acid:(meth)acrylate=100:0 to 30:70, and a particularly preferred mass ratio is (meth)acrylic acid:(meth)acrylate=100:0 to 35:65.

Examples of the hydroxyl group-containing monomer include a 2-hydroxyethyl acrylate monomer, a 2-hydroxyethyl methacrylate monomer, a 2-hydroxypropyl acrylate monomer, a 2-hydroxypropyl methacrylate monomer, and a 4-hydroxybutyl acrylate monomer.

Examples of the amide group-containing monomer include an acrylamide monomer and a dimethylacrylamide monomer.

Examples of the polyoxyethylene group-containing monomer include a methoxypolyethylene glycol acrylate monomer and a methoxypolyethylene glycol methacrylate monomer.

A repeating unit constituting the resin contained in the hollow resin particle may contain a crosslinkable monomer unit.

In the present disclosure, a crosslinkable monomer means a compound having two or more polymerizable functional groups. The mechanical characteristics of the obtained copolymer shell can be enhanced by using the crosslinkable monomer. Further, since the crosslinkable monomer has a plurality of polymerizable functional groups, the monovinyl monomer and the hydrophilic monomer and so on described above can be linked together, particularly the heat resistance of the obtained hollow resin particle can be enhanced.

A crosslinkable monomer is not particularly limited as long as it has two or more polymerizable functional groups. Examples of the crosslinkable polymerizable monomer include: aromatic divinyl compounds such as divinyl benzene, divinyl naphthalene, diallyl phthalate and derivatives thereof; ester compounds such as allyl (meth)acrylate, ethylene glycol di(meth)acrylate and diethylene glycol di(meth)acrylate, in which two or more compounds having a carbon-carbon double bond are esterified to a compound having two or more hydroxyl groups or carboxyl groups; other divinyl compounds such as N,N-divinylaniline and divinyl ether. Among them, divinyl benzene and ethylene glycol di(meth)acrylate are preferred.

Incidentally, as a monomer, other polymerizable monomers may be contained as well as the monovinyl monomer, the hydrophilic monomer and the crosslinkable monomer.

With respect to 100 parts by mass of the repeating units constituting the resin, the content ratio of the crosslinkable monomer unit may be from 25 parts by mass to 59 parts by mass, preferably from 30 parts by mass to 57 parts by mass, and more preferably from 35 parts by mass to 55 parts by mass. When the content of the crosslinkable monomer contained is from 25 parts by mass to 59 parts by mass, the obtained hollow resin particles are not likely to be dented, so that the void ratio of the hollow resin particle can be maintained at a high level, and furthermore the volatile organic compound is not likely to remain in the hollow resin particle.

The content ratio of the crosslinkable monomer unit is determined, for example, by calculating the ratio of the crosslinkable monomer subjected to the polymerization reaction, from the charged amount of the crosslinkable monomer at the time of polymerization and the remained amount of the crosslinkable monomer at the end of the polymerization.

The resin constituting the hollow resin particle may be, for example, urethane resins or epoxy resins as well as the above-mentioned resins. Among these resins, for example, the resin constituting the hollow resin particle may be urethane resins from the viewpoint of excellent heat insulating properties, or may be epoxy resins from the viewpoint of expectation of high compressive strength.

The shape of the hollow resin particle is not particularly limited as long as a hollow portion is formed in the interior, and examples include a spherical shape, an ellipsoidal shape and an irregular shape. Among these, a spherical shape is preferable in terms of ease of production.

The interior of the particle has one or two or more hollow portions. The interior of the particle may be porous as long as a hollow portion can be found. The interior of the particle preferably has 5 or less hollow portions, more preferably 3 or less hollow portions, still more preferably 2 or less hollow portions, particularly preferably one hollow portion in order to maintain good balance between a high void ratio of the hollow resin particle and compressive strength of the hollow resin particle.

The average circularity of the hollow resin particles may be from 0.950 to 0.995, may be from 0.970 to 0.995, and may be from 0.980 to 0.995.

In the present disclosure, "circularity" is defined as a value obtained by dividing the perimeter of a circle having the same area as the projected area of a particle image, by the perimeter of the particle image. "Average circularity" in the present disclosure is used as a simple method of quantitatively representing the shape of the hollow resin particles and is an indicator that shows the degree of the surface roughness of the hollow resin particles. The average circularity is 1 when the hollow resin particles are perfectly spherical, and it gets smaller as the surface shape of the hollow resin particles becomes more complex.

When the hollow resin particle of the present disclosure has a shell, the shell thickness may be from 0.01 μm to 1.0 μm, may be from 0.02 μm to 0.95 μm, and may be from 0.05 μm to 0.90 μm.

When the shell thickness is 0.01 μm or more, the hollow resin particles can keep such a higher compressive strength that allows the particles to maintain the shape thereof. When the shell thickness is 1.0 μm or less, the hollow portion with a larger volume can be ensured in the interior of the hollow resin particle.

The method for measuring the shell thickness of the hollow resin particle is as follows. First, 20 hollow resin particles are selected as measurement objects. SEM observation of the cross sections of the hollow resin particles is performed. Next, from the thus-obtained SEM images of the cross sections of the particles, the thicknesses of the shells of the 20 hollow resin particles are measured. The average of the thicknesses is determined as the shell thickness of the hollow resin particle.

An example of an image of the shape of the hollow resin particle is a bag that comprises a thin covering film and is swollen with gas, and a cross-sectional view of the bag is like a hollow resin particle 100 in FIG. 1 described later. In this example, the outermost layer of the hollow resin particle is formed by one thin covering film, and the interior is filled with gas.

The shape of the hollow resin particle can be determined by performing SEM or TEM. Further, the shape of the interior of the hollow resin particle can be determined by cutting the particle into round slices by a known method and then performing SEM or TEM.

Possible examples of the intended application of the hollow resin particles include an under-coating material of thermal paper. In general, an under-coating material is required to have heat insulating properties and shock-absorbing properties (cushioning properties), and is required to have, in addition to these, heat resistance in line with thermal paper uses. The hollow resin particles of the present disclosure can meet these requirements by virtue of their high void ratio, hard-to-crush hollow shape, the specified number average particle diameter, and high heat resistance.

Further, the hollow resin particle is useful as, for example, a plastic pigment that is excellent in gloss or masking power. Further, the hollow resin particle obtained by enclosing a useful component such as a perfume, a medicine, an agricultural chemical, or an ink component, in the interior by a means such as immersion treatment or depressurized or pressurized immersion treatment can be used for any of various applications in accordance with the component contained in the interior.

As the intended application of the hollow resin particles, examples include, but are not limited to, applications for thermosensitive recording materials, fillers, scattering agents, coating materials and insulating materials.

2. Method for Producing Hollow Resin Particles

The method for producing the hollow resin particles is not particularly limited, as long as the hollow resin particles that satisfy the above-mentioned conditions of the number average particle diameter, the void ratio and the amount of the volatile organic compound, can be produced by the method. Hereinbelow, an embodiment of the method for producing the hollow resin particles is described, but the method for producing the hollow resin particles of the present disclosure is not limited to the following embodiment.

An embodiment of the method for producing the hollow resin particles includes a step comprising preparing a mixture liquid comprising at least one monomer selected from the group consisting of a monovinyl monomer and a hydrophilic monomer, a crosslinkable monomer, an oil-soluble polymerization initiator, a hydrocarbon solvent, a suspension stabilizer and an aqueous medium (mixture liquid preparation step);

a step comprising carrying out a suspension treatment of the mixture liquid described above to prepare a suspension in which monomer drops containing the hydrocarbon solvent are dispersed in the aqueous medium (suspension preparation step);

a step comprising subjecting the suspension described above to polymerization reaction to prepare a precursor composition containing a hollow resin particle precursor including the hydrocarbon solvent (polymerization step);

a step comprising performing solid-liquid separation of the precursor composition described above to obtain a hollow resin particle precursor (solid-liquid separation step); and a step comprising removing the hydrocarbon solvent included in the hollow resin particle precursor in a gaseous atmosphere to obtain a hollow resin particle (solvent removal step).

The disclosed embodiment includes, as described above, (1) a mixture liquid preparation step, (2) a suspension preparation step, (3) a polymerization step, (4) a solid-liquid separation step, and (5) a solvent removal step. The steps of the disclosed embodiment are not limited to these five steps.

FIG. 1 is a schematic diagram showing the disclosed embodiment. (1) to (5) in FIG. 1 correspond to the steps (1) to (5) described above, respectively. The white arrow between drawings is one for indicating the order of the steps. Incidentally, FIG. 1 is only schematic diagrams for description, and the method for producing the hollow resin particles of the present disclosure is not limited to the method shown in FIG. 1. Further, the structures, dimensions, and shapes of materials used for the method for producing the hollow resin particles of the present disclosure is not limited to the structures, dimensions, or shapes of the various materials in FIG. 1.

(1) of FIG. 1 is a schematic view showing an embodiment of a mixture liquid in the mixture liquid preparation step. As shown in the drawing, the mixture liquid contains an aqueous medium 1 and a low polarity material 2 dispersed in the aqueous medium 1. Here, the low polarity material 2 means a material that has low polarity and is less likely to mix with the aqueous medium 1, such as a monovinyl monomer and a hydrocarbon solvent.

(2) of FIG. 1 is a schematic view showing an embodiment of a suspension in the suspension preparation step. The suspension contains the aqueous medium 1 and a micelle 10 (monomer drop) dispersed in the aqueous medium 1. The micelle 10 is formed by surrounding the periphery of an oil-soluble monomer composition 4 (containing, for example, an oil-soluble polymerization initiator 5) with a surfactant 3.

(3) of FIG. 1 is a schematic view showing an embodiment of a precursor composition after the polymerization step. The precursor composition contains the aqueous medium 1 and a hollow resin particle precursor 20 dispersed in the aqueous medium 1. The hollow resin particle precursor 20 is formed by polymerization of a monovinyl monomer etc. in the micelle 10, and includes the hydrocarbon solvent 7 in the interior of the shell 6.

(4) of FIG. 1 is a schematic view showing an embodiment of a hollow resin particle precursor after the solid-liquid separation step. The figure of (4) shows a state where an aqueous medium 1 is separated from the state of (3).

(5) of FIG. 1 is a schematic view showing an embodiment of the hollow resin particle after the solvent removal step. The figure of (5) of FIG. 1 shows a state where a hydrocarbon solvent 7 is removed from the state of (4) of FIG. 1. As a result, a hollow resin particle 100 having a hollow portion 8 in the interior of the shell 6 is obtained.

Hereinbelow, the five steps mentioned above and other steps are described in order.

(1) Mixture Liquid Preparation Step

The present step is a step comprising preparing a mixture liquid containing (A) at least one monomer selected from the group consisting of a monovinyl monomer and a hydrophilic monomer, (B) a crosslinkable monomer, (C) an oil-soluble polymerization initiator, (E) a hydrocarbon solvent, (F) a suspension stabilizer, and an aqueous medium.

Among these, (A) a monovinyl monomer and a hydrophilic monomer, and (B) a crosslinkable monomer are as described above in "1. Hollow resin particle." Incidentally, other polymerizable monomers may be contained in the mixture liquid as well as (A) the at least one monomer selected from the group consisting of a monovinyl monomer and a hydrophilic monomer, and (B) the crosslinkable monomer, which are described above in "1. Hollow resin particle".

(C) Oil-Soluble Polymerization Initiator

In the disclosed embodiments, not an emulsion polymerization method using a water-soluble polymerization initiator but a suspension polymerization method using an oil-soluble polymerization initiator is employed. An advantage of employing the suspension polymerization method will be described in detail in "(2) Suspension preparation step".

The oil-soluble polymerization initiator is not particularly limited as long as it is a lipophilic one having a solubility in water of 0.2 (unit: g/100-$H_2O$) or less. Examples of the oil-soluble polymerization initiator include benzoyl peroxide, lauroyl peroxide, t-butyl peroxide 2-ethylhexanoate, 2,2'-azobis(2,4-dimethylvaleronitrile), and azobis(isobutyronitrile).

With respect to 100 parts by mass of the total mass of (A) the at least one monomer selected from the group consisting of a monovinyl monomer and a hydrophilic monomer and (B) the crosslinkable monomer, the content of (C) the oil-soluble polymerization initiator is preferably from 0.1 parts by mass to 10 parts by mass, more preferably from 0.5 parts by mass to 7 parts by mass, and still more preferably from 1 part by mass to 5 parts by mass. When the content of (C) the oil-soluble polymerization initiator is 0.1 parts by mass or more, the polymerization reaction is likely to progress sufficiently. When the content of (C) the oil-soluble polymerization initiator is 10 parts by mass or less, the oil-soluble polymerization initiator is not likely to be left after the end of polymerization reaction, so that an unexpected side reaction is not likely to progress.

(D) Hydrocarbon Solvent

The hydrocarbon solvent in the disclosed embodiments has the function of forming a hollow portion in the interior of the particle.

In the suspension preparation step described later, a suspension in which monomer drops containing a hydrocarbon solvent are dispersed in an aqueous medium is obtained. In the suspension preparation step, phase separation occurs in the monomer drop; as a result, the hydrocarbon solvent with low polarity is likely to collect in the interior of the monomer drop. In the end, in the monomer drop, the hydrocarbon solvent is distributed in the interior and other materials than the hydrocarbon solvent are distributed at the periphery, in accordance with the respective polarities.

Then, in the polymerization step described later, a precursor composition containing a hollow resin particle precursor including the hydrocarbon solvent is obtained. That is, the hydrocarbon solvent is collected in the interior of the particle, so that a hollow portion made of the hydrocarbon solvent is formed in the interior of the obtained polymer particle (hollow resin particle precursor).

The type of the hydrocarbon solvent is not particularly limited. Examples of the hydrocarbon solvent include solvents with relatively high volatility, such as benzene, toluene, xylene, butane, pentane, hexane, heptane and cyclohexane.

The relative permittivity at 20° C. of the hydrocarbon solvent used in the disclosed embodiments is preferably 3 or less. The relative permittivity is an index indicating the level of the polarity of the compound. In the case where the relative permittivity of the hydrocarbon solvent is 3 or less, which is sufficiently small, it is presumed that phase separation progresses rapidly in the monomer drop and a hollow is easily formed.

Examples of solvents having a relative permittivity at 20° C. of 3 or less are as follows. The inside of the parentheses is the value of relative permittivity.

Heptane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

The hydrocarbon solvent used in the disclosed embodiments may be a hydrocarbon compound having 5 to 7 carbon atoms. A hydrocarbon compound having 5 to 7 carbon atoms is easily included into a hollow resin particle precursor during the polymerization step, and furthermore can be easily removed from the interior of the hollow resin particle precursor during the solvent removal step. The hydrocarbon solvent is preferably a hydrocarbon compound having 6 carbon atoms.

With respect to 100 parts by mass of the total mass of (A) the at least one monomer selected from the group consisting of a monovinyl monomer and a hydrophilic monomer and (B) the crosslinkable monomer, the content of (D) the hydrocarbon solvent is preferably from 100 parts by mass to 900 parts by mass, more preferably from 150 parts by mass to 700 parts by mass, and still more preferably from 200 parts by mass to 500 parts by mass. When the content of (D) the hydrocarbon solvent is 100 parts by mass or more, the void ratio of the obtained hollow resin particle is not likely to be small. When the content of (D) the hydrocarbon solvent is 900 parts by mass or less, the obtained hollow resin particle is likely to be excellent in mechanical characteristics, and not likely to cause a failure of maintaining the hollow.

(E) Suspension Stabilizer

The suspension stabilizer is an agent that stabilizes a suspension state in a suspension in a suspension polymerization method described later.

The suspension stabilizer may contain a surfactant. The surfactant is a material that forms a micelle including at least one monomer selected from the group consisting of a monovinyl monomer and a hydrophilic monomer, a crosslinkable monomer, an oil-soluble polymerization initiator, an oil-soluble polymerization initiator and a hydrocarbon solvent, in the suspension polymerization method described later.

As the surfactant, any of cationic surfactants, anionic surfactants, and nonionic surfactants may be used, and these may be used in combination. Among these, anionic surfactants and nonionic surfactants are preferable, and anionic surfactants are more preferable.

Examples of the anionic surfactant include sodium dodecylbenzen sulfonate, sodium lauryl sulfate, dialkyl sodium sulfosuccinate and formalin condensate salt of naphthalene sulfonate.

Examples of the nonionic surfactant include polyoxyethylene alkyl ether, polyoxyethylene alkyl ester and polyoxyethylene sorbitan alkyl ester.

Examples of the cationic surfactant include didecyl dimethyl ammonium chloride and stearyl trimethyl ammonium chloride.

The suspension stabilizer may contain, for example, a hardly water-soluble inorganic compound or a water-soluble polymer.

With respect to 100 parts by mass of the total mass of (A) the at least one monomer selected from the group consisting of a monovinyl monomer and a hydrophilic monomer, (B) the crosslinkable monomer, (C) the oil-soluble polymerization initiator and (D) the hydrocarbon solvent, the content of (E) the suspension stabilizer is preferably from 0.1 parts by mass to 3 parts by mass, more preferably from 0.2 parts by mass to 2 parts by mass, and still more preferably from 0.3 parts by mass to 1 part by mass. When the content of (E) the suspension stabilizer is 0.1 parts by mass or more, micelles are easily formed in an aqueous medium. When the content of (E) the suspension stabilizer is 3 parts by mass or less, a reduction in productivity by increasing in blowing in the step of removing the hydrocarbon solvent is not likely to occur.

(F) Others

In the disclosed embodiments, an aqueous medium means one of water, a hydrophilic solvent and a mixture of water and a hydrophilic solvent.

The hydrophilic solvent in the disclosed embodiments is not particularly limited as long as it is one that mixes with water sufficiently and does not develop phase separation.

Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, it is important that the polarity of the entire mixture is not too low from the viewpoint of forming monomer drops. For example, the mixing ratio (mass ratio) between water and the hydrophilic solvent may be set to water: hydrophilic solvent=99:1 to 50:50.

The mixture liquid prepared in the present step is a composition in a state where the materials (A) to (E) mentioned above and an aqueous media are simply mixed and, for example, stirred as appropriate. In the mixture liquid, oil phases containing the materials (A) to (D) mentioned above are dispersed in an aqueous medium, each with a size of a particle diameter of approximately several millimeters. The dispersion state of these materials in the mixture liquid can be observed with the naked eye, depending on the types of the materials.

In the present step, an oil phase that contains (A) the at least one monomer selected from the group consisting of a monovinyl monomer and a hydrophilic monomer, (B) the crosslinkable monomer, (C) the oil-soluble polymerization initiator, and (D) the hydrocarbon solvent, and in which the content of (B) the crosslinkable monomer is from 25 parts by mass to 59 parts by mass with respect to 100 parts by mass of the total mass of (A) the at least one monomer selected from the group consisting of a monovinyl monomer and a hydrophilic monomer and (B) the crosslinkable monomer, may be mixed with an aqueous phase containing (E) the suspension stabilizer and the aqueous medium to prepare a mixture liquid. Particles of which the compositions are uniform can be produced by thus mixing the oil phase and the aqueous phase.

(2) Suspension Preparation Step

The present step is a step comprising carrying out a suspension treatment of the mixture liquid described above to prepare a suspension in which monomer drops containing the hydrocarbon solvent are dispersed in the aqueous medium.

In the suspension prepared in the present step, monomer drops each containing the materials (A) to (D) mentioned above and having a particle diameter of approximately from 0.1 µm to 9 µm are dispersed uniformly in the aqueous medium. Such monomer drops are difficult to be observed with the naked eye, and can be observed with, for example, known observation equipment such as an optical microscope.

As described above, not an emulsion polymerization method but a suspension polymerization method is employed in the disclosed embodiments. Hereinbelow, an advantage of using a suspension polymerization method and an oil-soluble polymerization initiator is described with contrast to an emulsion polymerization method.

Figure 4:
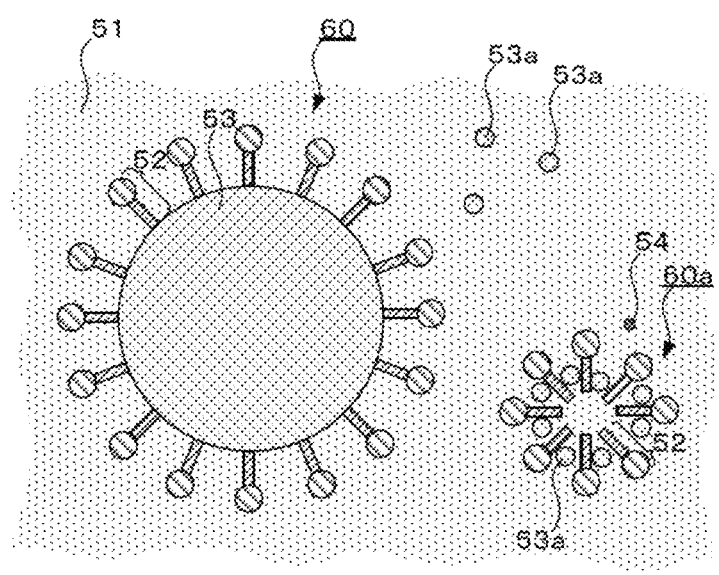
FIG. 4 is a schematic diagram showing a dispersion for conventional emulsion polymerization.

FIG. 4 is a schematic diagram showing a dispersion for emulsion polymerization. A micelle 60 in FIG. 4 schematically shows a cross section thereof.

FIG. 4 shows a situation where micelles 60, pieces of a micelle precursor 60a, pieces of a monomer 53a dissolved out in a solvent, and pieces of a water-soluble polymerization initiator 54 are dispersed in an aqueous medium 51. The micelle 60 is formed by a surfactant 52 surrounding the periphery of an oil-soluble monomer composition 53. The monomer composition 53 contains, for example, a monomer serving as a source material of a polymer, but does not contain a polymerization initiator.

On the other hand, the micelle precursor 60a is an aggregate of pieces of the surfactant 52, but does not contain a sufficient amount of the monomer composition 53 in the interior. The micelle precursor 60a, for example, incorporates pieces of the monomer 53a dissolved out in the solvent into the interior of the micelle precursor, and procures a part of the monomer composition 53 from other micelles 60; thereby, grows into the micelle 60.

The water-soluble polymerization initiator 54 enters the interiors of the micelle 60 and the micelle precursor 60a, and promotes the growth of oil drops in the interiors of these while being diffused in the aqueous medium 51. Therefore, in the emulsion polymerization method, although each micelle 60 is monodispersed in the aqueous medium 51, it is predicted that the particle diameter of the micelle 60 will grow up to several hundred nm.

Figure 2:
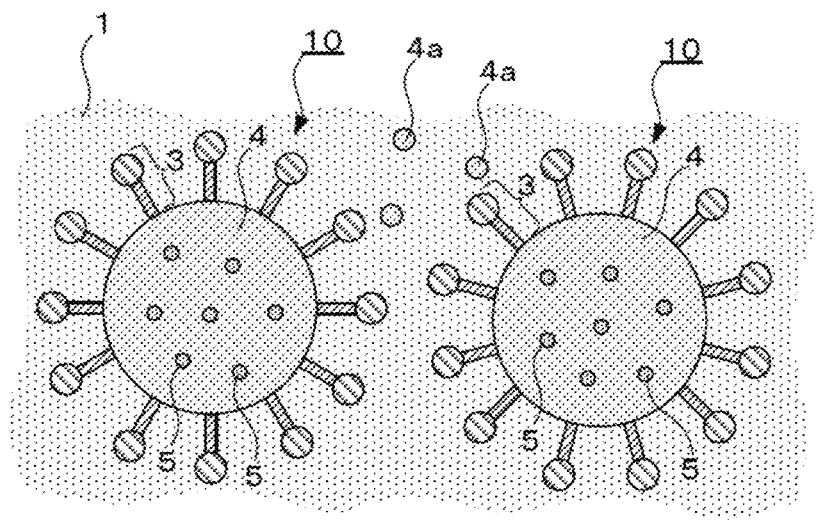
FIG. 2 is a schematic diagram showing an embodiment of a suspension in a suspension preparation step.

FIG. 2 is a schematic diagram showing an embodiment of a suspension in the present step. A micelle 10 in FIG. 2 schematically shows a cross section thereof. Incidentally, FIG. 2 is only a schematic diagram, and the suspension in the present disclosure is not necessarily limited to that shown in FIG. 2. A part of FIG. 2 corresponds to (2) of FIG. 1 described above.

FIG. 2 shows a situation where micelles 10 and pieces of monomers 4a (including the monovinyl monomer and the crosslinkable monomer) that are dispersed in an aqueous medium, are dispersed in an aqueous medium 1. The micelle 10 is formed by a surfactant 3 surrounding the periphery of an oil-soluble monomer composition 4. The monomer composition 4 contains an oil-soluble polymerization initiator 5, monomers (including a monovinyl monomer and a crosslinkable monomer) and a hydrocarbon solvent (none of these is illustrated).

As shown in FIG. 2, in the present step, a minute oil drop that is a micelle 10 which contains the monomer composition 4 in the interior is formed in advance, and then polymerization initiating radicals are generated in the minute oil drop from the oil-soluble polymerization initiator 5. Therefore, a hollow resin particle precursor with a target particle diameter can be produced without excessively growing the minute oil drop.

Further, as can be seen by comparing suspension polymerization (FIG. 2) and emulsion polymerization (FIG. 4), suspension polymerization (FIG. 2) does not provide an opportunity for the oil-soluble polymerization initiator 5 to come into contact with the monomer 4a dispersed in the aqueous medium 1. Thus, the generation of surplus polymer particles in addition to target hollow resin particles can be prevented by using an oil-soluble polymerization initiator.

A typical example of the present step is shown below.

A mixture liquid containing the materials (A) to (E) mentioned above is subjected to the suspension treatment to form monomer drops. The method of forming monomer drops is not particularly limited; for example, the formation is performed using an apparatus capable of performing strong stirring, such as an (in-line type) emulsifying disperser (manufactured by Pacific Machinery & Engineering Co., Ltd.; product name: MILDER) or a high-speed emulsifying disperser (manufactured by PRIMIX Corporation; product name: T.K.HOMOMIXER MARK II Type).

As described above, in the present step, since phase separation occurs in the monomer drop, the hydrocarbon solvent with low polarity is likely to collect in the interior of the monomer drop. As a result, in the obtained monomer drop, the hydrocarbon solvent is distributed in the interior, and other materials than the hydrocarbon solvent are distributed at the periphery.

A modified example of the present step is shown below.

First, an oil phase containing the materials (A) to (D) mentioned above and an aqueous phase containing the material (E) and an aqueous medium are prepared, respectively. The oil phase is prepared preferably as the content of (B) the crosslinkable monomer is from 25 parts by mass to 59 parts by mass, with respect to 100 parts by mass of the total mass of (A) the at least one monomer selected from the group consisting of a monovinyl monomer and a hydrophilic monomer, and (B) the crosslinkable monomer.

Next, a suspension is prepared by a membrane emulsification method. The membrane emulsification method is a method for obtaining, by extruding a dispersion phase solution into a continuous phase through the pores of a porous membrane, a suspension in which minute droplets of the dispersion phase are dispersed in the continuous phase.

The dispersion phase means a liquid phase dispersed in the form of minute droplets, and the continuous phase means a liquid phase surrounding the periphery of the dispersion phase droplets. In the disclosed embodiments, both a direct membrane emulsification method and a membrane emulsification method involving preliminary emulsification, may be employed, as long as they are membrane emulsification methods in which the oil phase is made into the dispersion phase and the aqueous phase is made into the continuous phase.

In the membrane emulsification method, a membrane emulsification system (such as MN-20 manufactured by SPG Technology Co., Ltd.) and a membrane having a specific pore diameter are used. As the porous membrane usable in the membrane emulsification method, examples include, but are not limited to, an inorganic porous membrane such as a shirasu porous glass membrane (an SPG membrane) and an organic porous membrane such as a PTFE membrane.

The pore diameter of the porous membrane used in the membrane emulsification method defines the diameter of the obtained minute droplets. Depending on the components in the dispersion phase, since the diameter of the minute droplets has an influence on the number average particle diameter of the obtained hollow resin particles, the selection of the pore diameter of the porous membrane is important. For example, in the case of using a shirasu porous glass membrane (an SPG membrane), the pore diameter of the membrane is preferably selected from 0.1 μm to 4.0 μm, more preferably selected from 0.2 μm to 3.5 μm, and still more preferably selected from 0.3 μm to 3.0 μm.

The suspension is prepared by performing the membrane emulsification in which the oil phase and the aqueous phase are made into the dispersion phase and the continuous phase, respectively, using the membrane emulsification system and the porous membrane.

Incidentally, the suspension preparation step of the present embodiment is not limited to the typical example and the modified example mentioned above.

(3) Polymerization Step

The present step is a step comprising subjecting the suspension described above to polymerization reaction to prepare a precursor composition containing a hollow resin particle precursor including the hydrocarbon solvent. Here, a hollow resin particle precursor is a particle formed mainly by copolymerization of the at least one selected from the group consisting of the monovinyl monomer and the hydrophilic monomer, and the crosslinkable monomer described above.

The polymerization system is not particularly limited; for example, a batch system, a semicontinuous system or a continuous system may be employed. The polymerization temperature is preferably from 40° C. to 80° C., and more preferably from 50° C. to 70° C. The polymerization reaction time is preferably from 1 hour to 20 hours, and more preferably from 2 hours to 15 hours. Since a monomer drop including the hydrocarbon solvent in the interior is used, as described above, the hollow filled with the hydrocarbon solvent is formed in the interior of the hollow resin particle precursor.

(4) Solid-Liquid Separation Step

The present step is a step comprising performing solid-liquid separation of the precursor composition described above to obtain a hollow resin particle precursor.

In the case where a hydrocarbon solvent included in a hollow resin particle precursor is removed in a slurry containing an aqueous medium, there is a problem that the obtained hollow resin particle is crushed unless the same volume of water as the hydrocarbon solvent released from the interior of the hollow resin particle precursor enters the interior of the particle.

A possible method to prevent the problem is a method in which the pH of the slurry is set to 7 or more to alkali-swell the shell of the particle, and then the hydrocarbon solvent is removed. In this case, since the shell of the particle acquires flexibility, replacement of the hydrocarbon solvent in the interior of the particle with water progresses rapidly, and a particle including water is obtained.

The method of performing solid-liquid separation of the precursor composition is not particularly limited as long as it is a method that separates the solid components containing the hollow resin particle precursor and the liquid components containing the aqueous medium without removing the hydrocarbon solvent included in the hollow resin particle precursor, and known methods may be used. Examples of the method of solid-liquid separation include a centrifugation method, a filtration method, and still-standing separation; among these, a centrifugation method or a filtration method may be employed, and from the viewpoint of simplicity of the operation, a centrifugation method may be employed.

An arbitrary step such as a preliminary drying step may be performed at a time after the solid-liquid separation step and before performing the solvent removal step described later. Examples of the preliminary drying step include a step comprising performing preliminary drying on the solid components obtained after the solid-liquid separation step, with a drying apparatus such as a dryer or a drying appliance such as a hand dryer.

(5) Solvent Removal Step

The present step is a step comprising removing the hydrocarbon solvent included in the hollow resin particle precursor in a gaseous atmosphere to obtain a hollow resin particle.

In the present step, "in a gaseous atmosphere" is not limited to the strict meaning of "in a gaseous atmosphere" which is in an environment where no liquid components exist in the outside of the hollow resin particle precursor, and it means in an environment where only a very small amount of liquid components at a level that does not influence the removal of the hydrocarbon solvent exist in the outside of the hollow resin particle precursor. "In a gaseous atmosphere" can be reworded as a state where the hollow resin particle precursor does not exist in a slurry, or can be reworded as a state where the hollow resin particle precursor exists in a dry powder.

As shown in Examples 1 to 5 described later, the fact that the hollow resin particle maintains a spherical shape after it has undergone vacuum drying during the solvent removal step and is then returned to normal pressure, is presumed to be an evidence that the gas transmissivity of the shell itself is relatively high.

It is generally known that the gas transmissivity of nylon, ethylene vinyl alcohol (EVOH) and the like is improved in high humidity. This is understood to be because these polymers are plasticized due to water molecules, and consequently the mobility of these polymers is increased.

However, the hollow resin particle of the present disclosure is presumed to have a high degree of crosslinking, and is therefore surmised to be less influenced by plasticization due to the action of the aqueous medium. Thus, in the present disclosure, the fact that the shell of the hollow resin particle has gas transmissivity is presumed to be due to the properties peculiar to the polymer contained in the shell.

The method of removing the hydrocarbon solvent in the hollow resin particle precursor in a gaseous atmosphere is not particularly limited, and known methods may be employed. Examples of the method include the reduced pressure drying method, the heat drying method, and the flash drying method, and use of these methods in combination.

In particular, in the case where the heat drying method is used, the heating temperature needs to be set to more than or equal to the boiling point of the hydrocarbon solvent and less than or equal to the highest temperature at which the shell structure of the hollow resin particle does not collapse. Therefore, depending on the composition of the shell of the hollow resin particle precursor and the type of the hydrocarbon solvent, for example, the heating temperature may be from 50° C. to 150° C., may be from 60° C. to 130° C., and may be from 70° C. to 100° C.

The hydrocarbon solvent in the interior of the hollow resin particle precursor is replaced with gas in the outside by drying operation in a gaseous atmosphere; as a result, a hollow resin particle in which the gas occupies the hollow portion is obtained.

The drying atmosphere is not particularly limited, and may be appropriately selected depending on the intended application of the hollow resin particle. Possible examples of the drying atmosphere include air, oxygen, nitrogen, and argon. Further, by filling the interior of the hollow resin particle with gas once and then performing reduced pressure drying, a hollow resin particle of which the interior is evacuated is also temporarily obtained.

A possible example of a step other than (1) to (5) mentioned above is a step in which the gas in the interior of the hollow resin particle is replaced with another gas or liquid. By such replacement, the environment of the interior of the hollow resin particle can be changed, molecules can be selectively confined in the interior of the hollow resin particle, or the chemical structure of the interior of the hollow resin particle can be modified in accordance with the intended application thereof.

3. Sheet

A sheet of the present disclosure comprises the hollow resin particles described above.

A sheet of the present disclosure may consist of only the hollow resin particles, or may comprise the hollow resin particles and other materials such as a binder.

The sheet of the present disclosure may be a single-layer sheet containing the hollow resin particles, or it may be a multilayer sheet formed by stacking a layer containing the hollow resin particles and one or two or more different layers.

The shape, area and thickness of the sheet of the present disclosure can be determined without limitation, depending on the intended application thereof. Of them, the thickness of the sheet of the present disclosure may be from 10 μm to 1 mm, for example.

The method for producing the sheet of the present disclosure may be a conventionally known method. For example, the sheet of the present disclosure can be produced by the following method.

First, a mixture liquid containing the hollow resin particles, a binder such as polyvinyl alcohol (PVA) and a surfactant is applied on a substrate such as a PET substrate. At this time, the amount of the applied mixture liquid is adjusted so that the average thickness of only the layer containing the hollow resin particle after drying the mixture liquid (the average thickness not containing the substrate) is the desired thickness. The substrate on which the mixture liquid is applied is appropriately dried, thereby producing the sheet on the substrate. The obtained multilayer sheet may be used for various kinds of applications described below, or the single-layer sheet obtained by removal from the substrate may be used for various kinds of applications described below.

Hereinafter, the evaluation of the heat insulating properties of the sheet using the hollow resin particles and the evaluation of the heat resistance thereof will be described.

The heat insulating properties of the sheet using the hollow resin particles can be evaluated by the thermal conductivity of the sheet, for example. The method for measuring the thermal conductivity of the sheet is as follows.

The thermal conductivity of the sheet obtained by the transient hot-wire method is measured under the following test conditions, using a quick thermal conductivity meter (such as QTM-500 manufactured by Kyoto Electronics Manufacturing Co., Ltd.) and a software for measuring thermal conductivity of thin sheet for QTM (such as SOFT-QTM5W manufactured by Kyoto Electronics Manufacturing Co., Ltd.)

(Test Conditions)
Probe: PD-11
Reference plate: Foamed polyethylene

When the thermal conductivity of the sheet is low, the sheet can be evaluated to have excellent heat insulating properties. For example, when the thermal conductivity of the sheet is 0.060 (W/(m×K)) or less, depending on the intended application of the sheet, the sheet can be evaluated to have sufficient heat insulating properties.

The heat resistance of the sheet comprising the hollow resin particles can be evaluated by, for example, the thickness change rate of the sheet under high temperature environment. The thickness change rate of the sheet under high temperature environment can be determined by the following method.

Figure 5:
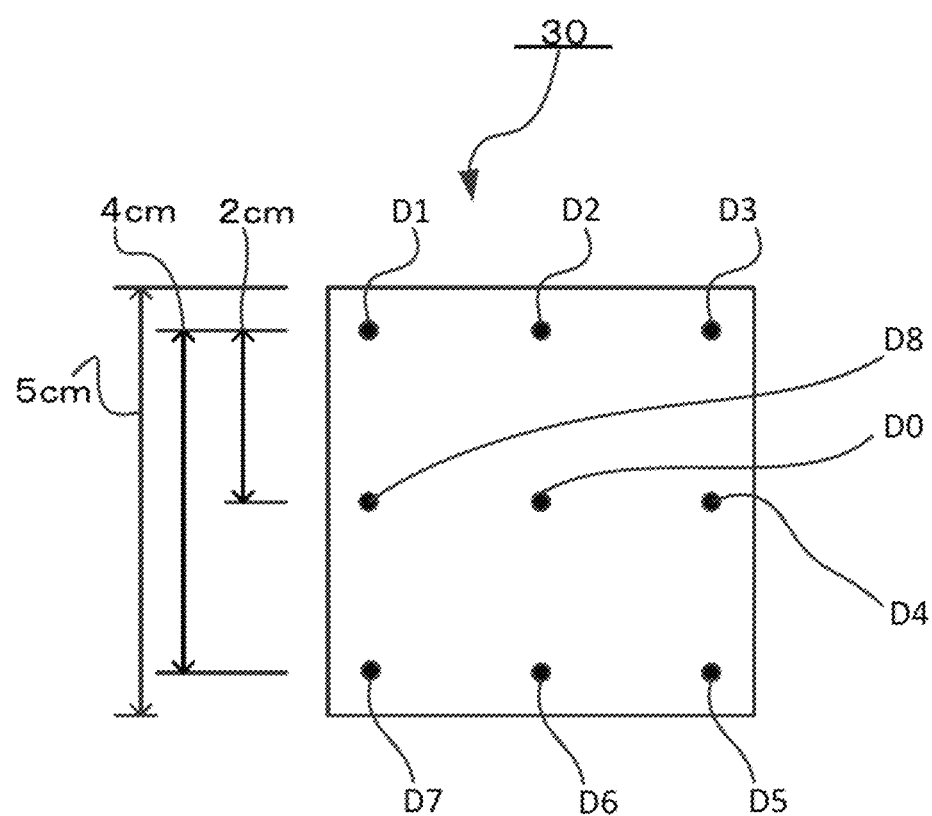
FIG. 5 is a view illustrating a test sheet used for the test to evaluate a thickness change of a sheet under high temperature environment.

A further description will be provided with reference to FIG. 5. First, a sheet (a test sheet 30) is processed into the following shape and size: a square with a side of 5 cm. Next, on a plane surface of the 5 cm square test sheet 30, a center point (D0) and different eight points (D1 to D8) arranged around the center point are disposed. At this time, these nine points are selected so that when the different eight points (D1 to D8) are each connected to the closest points by a line, a square with a side of 4 cm is formed, which is in such a similar shape to the test sheet that the center is the same as the center point (D0) of the test sheet and the shape is slightly smaller than the test sheet, and when the center point (D0), any one of the four corner points (that is, D1, D2, D3 or D4) and two points (for example, D2 and D8) closest to the two points are selected and each connected to the closest points by a line, four squares with a side of 2 cm are arranged in a grid pattern.

Next, the thicknesses at the nine points of the sheet are measured by use of a micrometer (such as MDQ-30 manufactured by Mitutoyo Corporation). The average of the thicknesses is determined as the average thickness $T_0$ (μm) before heating.

Next, the test sheet 30 is heated in a dryer at 120° C. for 72 hours. Then, the sheet is taken out from the dryer and naturally cooled down. Then, the thicknesses of the nine points are measured in the same manner as above, and the average of the thicknesses is determined as the average thickness $T_1$ (μm) after heating.

The thickness change rate of the sheet under the high temperature environment is measured by the following formula (X):

$$\Delta T = 100 \times \{|T_1 - T_0|/T_0\} \quad \text{Formula (X)}$$

where ΔT is the thickness change rate (%) of the sheet under the high temperature environment; $T_1$ is the average thickness (μm) after heating; and $T_0$ is the average thickness (μm) before heating.

When the thickness change rate ΔT of the sheet under the high temperature environment is small, the sheet can be evaluated to have excellent heat resistance. For example, when the thickness change rate ΔT of the sheet under the high temperature environment is 8.0% or less, depending on the intended application of the sheet, the sheet can be evaluated as follows: the thickness of the sheet is less likely to change even under the high temperature environment, and the sheet has sufficient heat resistance.

The intended application of the sheet of the present disclosure relates to the intended application of the above-described hollow resin particles. As the intended application of the sheet of the present disclosure, examples include, but are not limited to, a thermosensitive recording sheet and an insulation sheet.

EXAMPLES

Hereinbelow, the present invention is described more specifically using Examples and Comparative Examples; but the present invention is not limited to these Examples.

Incidentally, "parts" and "%" are on a mass basis unless otherwise specified.

The test methods performed in the present Examples and Comparative Examples are as follows.

1. Production of Hollow Resin Particles

Example 1

(1) Mixture Liquid Preparation Step

First, materials (a1) to (d1) below were mixed. The obtained mixture was used as an oil phase.
(a1) Methacrylic acid: 20 parts
(a2) Methyl methacrylate: 30 parts
(b) Ethylene glycol dimethacrylate: 50 parts
(c1) 2,2'-Azobis(2,4-dimethylvaleronitrile) (an oil-soluble polymerization initiator, manufactured by Wako Pure Chemical Industries, Ltd.; product name: V-65): 3 parts
(d1) Cyclohexane: 300 parts Next, 4 parts of (e) a surfactant was added to 800 parts of ion-exchanged water. The obtained mixture was used as an aqueous phase.

The aqueous phase and the oil phase were mixed, and thus a mixture liquid was prepared.

(2) Suspension Preparation Step

The mixture liquid mentioned above was stirred with an in-line type emulsifying disperser (product name: MILDER, manufactured by: Pacific Machinery & Engineering Co., Ltd.) at a rotational frequency of 15,000 rpm to be suspended, and a suspension in which monomer drops including cyclohexane were dispersed in water was prepared.

(3) Polymerization Step

The suspension mentioned above was stirred in a nitrogen atmosphere at 65' C for 4 hours, and polymerization reaction was performed. By this polymerization reaction, a precursor composition containing a hollow resin particle precursor including cyclohexane was prepared.

(4) Solid-Liquid Separation Step

The obtained precursor composition was subjected to centrifugation with a cooling high-speed centrifuge (product name: H-9R, manufactured by: Kokusan Co.Ltd) using a rotor MN1 at a rotational frequency of 3,000 rpm and a centrifugation time of 20 minutes, and the solid components were dehydrated. The solid components after dehydration were dried with a dryer at a temperature of 40° C., and a hollow resin particle precursor including cyclohexane was obtained.

(5) Solvent Removal Step

The hollow resin particle precursor was subjected to heating treatment with a vacuum dryer at 80° C. for 15 hours in a gaseous atmosphere, and thereby particles of Example 1 were obtained. From the scanning electron microscopy result and void ratio value of the particles, the particles were confirmed to be in a spherical shape and to have only one hollow portion.

Examples 2 to 3

Particles of Examples 2 and 3 were obtained by a similar production method to Example 1 except that the materials and the addition amounts shown in Table 1 were employed in "(1) Mixture liquid preparation step" of Example 1. From the scanning electron microscopy result and void ratio value of the particles, the particles were confirmed to be in a spherical shape and to have only one hollow portion.

Example 4

The particles of Example 4 were obtained by a similar production method to Example 1, except the following: the materials and addition amounts shown in Table 1 were employed in "(1) Mixture liquid preparation step" of Example 1; the aqueous phase and the oil phase were supplied to the next "(2) Suspension preparation step" without mixing them; and in "(2) Suspension preparation step" of Example 1, a suspension was prepared by, instead of a suspension method using an in-line type emulsifying disperser, performing membrane emulsification in which the oil phase and the aqueous phase were made into the dispersion phase and the continuous phase, respectively, using a membrane emulsification system (model number: MN-20, manufactured by: SPG Technology Co., Ltd.) and a shirasu porous glass membrane having a pore diameter of 3 µm (a SPG membrane, diameter 10 mm, length 20 mm, manufactured by SPG Technology Co., Ltd.). From the scanning electron microscopy result and void ratio value of the particles, the particles were confirmed to be in a spherical shape and to have only one hollow portion.

Example 5

The particles of Example 5 were obtained by a similar production method to Example 1, except the following: the materials and addition amounts shown in Table 1 were employed in "(1) Mixture liquid preparation step" of Example 1; the aqueous phase and the oil phase were supplied to the next "(2) Suspension preparation step" without mixing them; and in "(2) Suspension preparation step" of Example 1, a suspension was prepared by, instead of a suspension method using an in-line type emulsifying disperser, performing membrane emulsification in which the oil phase and the aqueous phase were made into the dispersion phase and the continuous phase, respectively, using a membrane emulsification system (model number: MN-20, manufactured by: SPG Technology Co., Ltd.) and a shirasu porous glass membrane having a pore diameter of 0.3 µm (a SPG membrane, diameter 10 mm, length 20 mm, manufactured by SPG Technology Co., Ltd.). From the scanning electron microscopy result and void ratio value of the particles, the particles were confirmed to be in a spherical shape and to have only one hollow portion.

Comparative Example 1

The particles of Comparative Example 1 were obtained by a similar production method to Example 1, except the following: the materials and addition amounts shown in Table 1 were employed in "(1) Mixture liquid preparation step" of Example 1; the aqueous phase and the oil phase were supplied to the next "(2) Suspension preparation step" without mixing them; and in "(2) Suspension preparation step" of Example 1, a suspension was prepared by, instead of a suspension method using an in-line type emulsifying disperser, performing membrane emulsification in which the oil phase and the aqueous phase were made into the dispersion phase and the continuous phase, respectively, using a membrane emulsification system (model number: MN-20, manufactured by: SPG Technology Co., Ltd.) and a shirasu porous glass membrane having a pore diameter of 5 µm (a SPG membrane, diameter 10 mm, length 20 mm, manufactured by SPG Technology Co., Ltd.). From the scanning electron microscopy result and void ratio value of the particles, the particles were confirmed to be in a spherical shape and to have only one hollow portion.

Comparative Examples 2 to 3

Particles of Comparative Examples 2 and 3 were obtained by a similar production method to Example 1 except that the materials and the addition amounts shown in Table 1 were employed in "(1) Mixture liquid preparation step" of Example 1. From the scanning electron microscopy result and void ratio value of the particles, the particles were confirmed to be in a spherical shape and to have only one hollow portion.

Comparative Example 4

First, materials (a2), ($\alpha$1), ($\alpha$2), (c2) and (d2) below were mixed. The obtained mixture was used as an oil phase.
  (a2) Methyl methacrylate: 10 parts
  ($\alpha$1) Acrylonitrile: 60 parts
  ($\alpha$2) Methacrylonitrile: 30 parts
  (c2) Azobis(isobutyronitrile): 5 parts
  (d2) Isopentane: 30 parts Next, 200 parts of (y) a colloidal silica dispersion (the average particle diameter: 5 nm; the effective concentration of colloidal silica: 20% by mass) was added to 600 parts of ion-exchanged water. The obtained mixture was used as an aqueous phase.

The aqueous phase and the oil phase were mixed, and thus a mixture liquid was prepared.

The mixture liquid mentioned above was stirred with a disperser (product name: HOMOMIXER, manufactured by: Primix Corporation) at a rotational frequency of 4,000 rpm for 1 minute, and was suspended. The obtained suspension was stirred at a temperature condition of 60° C. for 10 hours, and a polymerization reaction was performed.

The suspension after the polymerization reaction was filtered, and the obtained solid components were dried with a dryer at 40° C. to obtain thermally expandable microcapsules.

Then, 100 parts of the obtained thermally expandable microcapsules were subjected to heating treatment with a dryer at 180° C. for 3 minutes in a gaseous atmosphere, and thereby hollow resin particles of Comparative Example 4 were obtained. From the scanning electron microscopy result and void ratio value of the particles, the particles were confirmed to be in a spherical shape and to have only one hollow portion.

2. Measurement and Evaluation of Particles

The following measurement and evaluation were performed on the particles of Example ands 1 to 5 and Comparative Examples 1 to 4. Details are as follows.

(1) Measurement of a Number Average Particle Diameter, a Volume Average Particle Diameter and a Particle Size Distribution of Particles The particle diameter of each particle was measured using a laser diffraction particle size distribution measuring instrument (product name: SALD-2000, manufactured by: Shimadzu Corporation), the number average particle diameter and the volume average particle diameter of them were calculated, and the obtained values were taken as the number average particle diameter and the volume average particle diameter of the particles. The value obtained by dividing the volume average particle diameter by the number average particle diameter was taken as the particle size distribution.

(2) Measurement of Density of Particle and Calculation of Void Ratio

A. Measurement of Apparent Density of Particle

First, approximately 30 cm³ of particles were introduced into a measuring flask with a volume of 100 cm³, and the mass of the introduced particles was precisely weighed. Next, the measuring flask in which the particles were introduced was precisely filled with isopropanol up to the marked line while care was taken so that air bubbles did not get in. The mass of the isopropanol added to the measuring flask was precisely weighed, and the apparent density $D_1$ (g/cm³) of the particle was calculated on the basis of Formula (I) below.

Apparent density $D_1$=[Mass of the particles]/(100−[Mass of the isopropanol]÷[Specific gravity of isopropanol at the measuring temperature])    Formula (I)

B. Measurement of True Density of Particle

Particles were pulverized in advance; then, approximately 10 g of pulverized pieces of particles were introduced into a measuring flask with a volume of 100 cm³, and the mass of the introduced pulverized pieces was precisely weighed.

After that, similarly to the measurement of the apparent density mentioned above, isopropanol was added to the measuring flask, the mass of the isopropanol was precisely weighed, and the true density $D_2$ (g/cm³) of the particle was calculated on the basis of Formula (II) below.

True density $D_0$=[Mass of the pulverized pieces of particles]/(100−[Mass of the isopropanol]÷[Specific gravity of isopropanol at the measuring temperature])    Formula (II)

C. Calculation of Void Ratio

The apparent density $D_1$ was divided by the true density $D_0$. The resultant was multiplied by 100, and the value thus obtained was subtracted from 100, thereby obtaining the void ratio of the particle.

(3) Measurement and Calculation of Shell Thickness

First, 20 hollow resin particles were selected as measurement objects. SEM observation of the cross sections of the hollow resin particles was performed. Next, from the thus-obtained SEM images of the cross sections of the particles, the thicknesses of the shells of the 20 hollow resin particles were measured. The average of the thicknesses was determined as the shell thickness of the hollow resin particle.

(4) Amount of Volatile Organic Compound Contained in Hollow Resin Particle

A method of measuring the amount of the volatile organic compound contained in the hollow resin particle is as follows. Approximately 100 mg of hollow resin particles were put into a 30 mL screw cap glass bottle, and were precisely weighed. Subsequently, approximately 10 g of tetrahydrofuran (THF) was put in, and was precisely weighed. The mixture in the glass bottle was stirred for 1 hour with a stirrer, and the volatile organic compound (for example, a hydrocarbon solvent) contained in the hollow resin particle was extracted. The stirring was stopped, and the resin components of the hollow resin particles insoluble in THF were precipitated; then, a filter (product name: MEMBRANE FILTER 25JP020AN, manufactured by: Advantec) was installed at a syringe barrel, and the precipitate was filtered out to obtain a sample liquid; and the sample liquid was injected into gas chromatography (GC) to be analyzed. The amount (% by mass) of the volatile organic compound per unit mass contained in the hollow resin particle was found from a peak area of GC and a working curve created in advance. Detailed analysis conditions are as follows.

(Analysis Conditions)

Apparatus: GC-2010 (manufactured by Shimadzu Corporation)

Column: DB-5 (manufactured by Agilent Technologies Japan, Ltd.)

df=0.25 μm, 0.25 mm I.D.×30 m

Detector: FID

Carrier gas: nitrogen (linear velocity: 28.8 cm/sec)

Temperature of the injection port: 200° C.

Temperature of the detector: 250° C.

Temperature of the oven: raised from 40° C. to 230° C. at a rate of 10° C./minute, and held at 230° C. for 2 minutes Amount of sampling: 2 μL (5) Compressive Strength of Particle The 10% compressive strength of the particle was measured under the following test conditions, using a micro compression tester (MCTM-500 manufactured by Shimadzu Corporation).

(Test Conditions)

Indenter type: FLAT50

Object lens magnification: 50

Loading rate: 0.8924 mN/sec (6) Observation of Shape of Particle

Figure 3A:
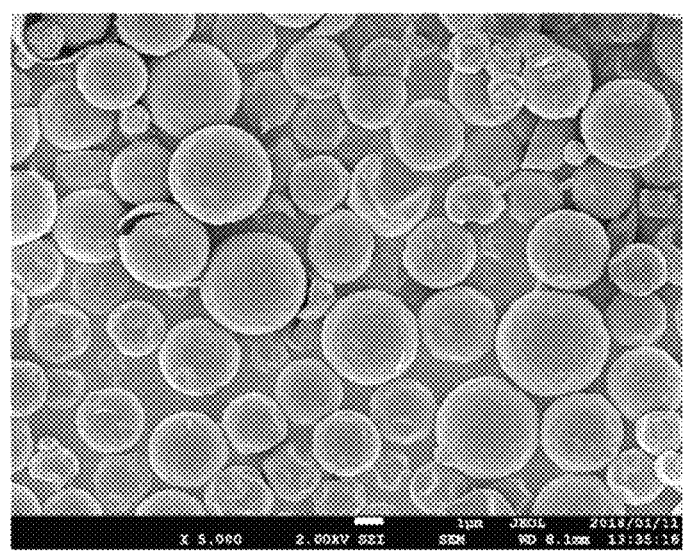
FIG. 3A is a SEM image of hollow resin particles of Example 1.
Figure 3B:
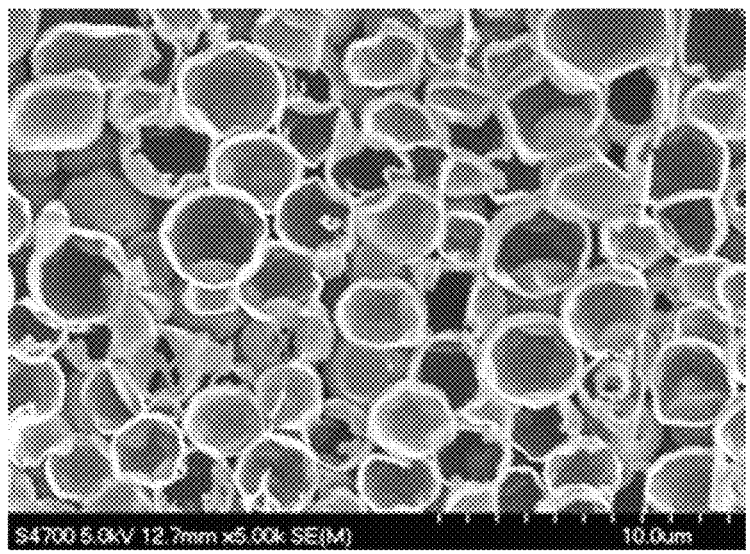
FIG. 3B is a SEM image of a cross section of hollow resin particles of Example 1.

FIG. 3A is a SEM image of hollow resin particles of Example 1. FIG. 3B is a SEM image of a cross section of hollow resin particles of Example 1.

The conditions for SEM observation are as follows.

Scanning electron microscope:
  Manufactured by JEOL Ltd.; model number: JSM-7610F (FIG. 3A)
  Manufactured by Hitachi, Ltd.; model number: S-4700 (FIG. 3B)

Acceleration voltage: 2.0 kV (FIG. 3A), 5.0 kV (FIG. 3B)

Magnification: 5,000 times (FIG. 3A, FIG. 3B)

From these figures, it can be determined that the interior of the particle of Example 1 is hollow and that, although the interior is hollow, the particle is not crushed but maintains a spherical shape.

3. Production of Sheet

Using hollow resin particles of Examples 1 to 5 and Comparative Examples 1 to 4, sheets were produced by the following method.

A mixture containing 100 parts of the hollow resin particles and 3 parts of polyvinyl alcohol (PVA) was mixed with a sodium dodecylbenzen sulfonate 1% by mass aqueous solution to obtain a solid content of 10% by mass. The thus-obtained mixture liquid was applied on a PET film substrate (thickness: 50 μm) having a corona-treated surface, using a wire coater. At this time, the amount of the applied mixture liquid was adjusted so that the average thickness of only the layer containing the particles after drying the mixture liquid (the average thickness not containing the PET film substrate) was 100 μm. The PET film substrate on which the mixture liquid was applied, was dried at 50° C. for 24 hours, thereby producing a multilayer sheet in which the layer containing the hollow resin particles was formed on the PET film substrate. The multilayer sheet was used for subsequent experiments.

Hereinafter, the sheets produced by using the particles of Examples 1 to 5 and Comparative Examples 1 to 4 will be referred to as the sheets of Examples 1 to 5 and Comparative Examples 1 to 4, respectively.

4. Measurement and Evaluation of Sheet

The following measurement and evaluation were performed on the sheets of Examples 1 to 5 and Comparative Examples 1 to 4. Details are as follows.

(1) Measurement of Thermal Conductivity of Sheet

The thermal conductivity of the sheet obtained by the transient hot-wire method was measured under the following test conditions, using a quick thermal conductivity meter (QTM-500 manufactured by Kyoto Electronics Manufacturing Co., Ltd.) and a software for measuring thermal conductivity of thin sheet for QTM (SOFT-QTM5W manufactured by Kyoto Electronics Manufacturing Co., Ltd.)

(Test Conditions)

Probe: PD-11

Reference plate: Foamed polyethylene (2) Measurement of Thickness Change Rate of Sheet Under High Temperature Environment As shown in FIG. 5, first, a sheet (a test sheet 30) was processed into the following shape and size: a square with a side of 5 cm. Next, on a plane surface of the 5 cm square test sheet 30, a center point (D0) and different eight points (D1 to D8) arranged around the center point were disposed. At this time, these nine points were selected so that when the different eight points (D1 to D8) were each connected to the closest points by a line, a square with a side of 4 cm was formed, which was in such a similar shape to the test sheet that the center was the same as the center point (D0) of the test sheet and the shape was slightly smaller than the test sheet, and when the center point (D0), any one of the four corner points (that is, D1, D2, D3 or D4) and two points (for example, D2 and D) closest to the two points were selected and each connected to the closest points by a line, four squares with a side of 2 cm were arranged in a grid pattern.

Next, the thicknesses at the nine points of the sheet were measured by use of a micrometer (model number: MDQ-30, manufactured by: Mitutoyo Corporation). The average of the thicknesses was determined as the average thickness $T_0$ (μm) before heating.

Next, the sheet was heated in a dryer at 120° C. for 72 hours. Then, the sheet was taken out from the dryer and naturally cooled down. Then, the thicknesses of the nine points were measured in the same manner as above, and the average of the thicknesses was determined as the average thickness $T_1$ (μm) after heating.

The thickness change rate of the sheet under the high temperature environment was measured by the following formula (X):

$$\Delta T = 100 \times \{|T_1 - T_0|/T_0\} \quad \text{Formula (X)}$$

where $\Delta T$ is the thickness change rate (%) of the sheet under the high temperature environment; $T_1$ is the average thickness (μm) after heating; and $T_0$ is the average thickness (μm) before heating.

The measurement and evaluation results of particles and sheets of Examples 1 to 5 and Comparative Examples 1 to 4 are shown in Table 1 below together with their raw material composition.

TABLE 1

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Monomer | Methacrylic acid (parts) | 20 | 15 | 15 | 30 | 20 | 35 | 20 | 35 | — |
|  | Methyl methacrylate (parts) | 30 | 25 | 40 | 20 | 25 | — | 50 | — | 10 |
|  | Butyl acrylate (parts) | — | 20 | 20 | — | 10 | — | 15 | — | — |
|  | Acrylonitrile (parts) | — | — | — | — | — | — | — | — | 60 |
|  | Methacrylonitrile (parts) | — | — | — | — | — | — | — | — | 30 |
| Crosslinkable monomer | Ethylene glycol dimethacrylate (parts) | 50 | 40 | 25 | — | 45 | 65 | 15 | 65 | — |
|  | Divinylbenzene (parts) | — | — | — | 50 | — | — | — | — | — |
| Oil-soluble polymerization initiator | 2,2'-Azobis(2,4-dimethylvaleronitrite) (parts) | 3 | 3 | 3 | 3 | 3 | 3 | 3 | 3 | — |
|  | Azobis(isobutyronitrite) (parts) | — | — | — | — | — | — | — | — | 5 |

TABLE 1-continued

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Hydrocarbon solvent | Cyclohexane (parts) | 300 | 600 | 300 | 250 | 300 | 300 | 150 | 250 | — |
|  | Isopentane (parts) | — | — | — | — | — | — | — | — | 30 |
| Dispersant | Surfactant (parts) | 4.0 | 3.0 | 2.5 | 3.0 | 3.0 | 3.0 | 3.5 | 4.0 | — |
|  | Colloidal silica dispersion (parts) | — | — | — | — | — | — | — | — | 200 |
| Ion-exchanged water (parts) |  | 800 | 800 | 600 | 800 | 800 | 800 | 800 | 800 | 600 |
| Evaluation of particle | Number average particle diameter (μm) | 1.9 | 3.8 | 5.0 | 9.0 | 0.9 | 15 | 2.9 | 1.8 | 12 |
|  | Volume average particle diameter (μm) | 2.7 | 7.3 | 9.8 | 11 | 1.1 | 16 | 5.5 | 3.0 | 26 |
|  | Particle size distribution | 1.4 | 1.9 | 2.0 | 1.2 | 1.2 | 1.1 | 1.9 | 1.7 | 2.2 |
|  | Void ratio (%) | 80 | 90 | 79 | 74 | 78 | 80 | 63 | 74 | 86 |
|  | Shell thickness (μm) | 0.13 | 0.12 | 0.40 | 0.82 | 0.07 | 1.05 | 0.41 | 0.21 | 0.68 |
|  | Amount of volatile organic compound (% by mass) | 1.3 | 2.1 | 0.8 | 2.4 | 3.0 | 2.3 | 3.8 | 20.2 | 12.0 |
|  | Apparent density D1 (g/cm3) | 0.24 | 0.12 | 0.25 | 0.31 | 0.26 | 0.24 | 0.44 | 0.31 | 0.17 |
|  | True density D0 (g/cm3) | 1.20 | 1.20 | 1.19 | 1.19 | 1.19 | 1.19 | 1.18 | 1.18 | 1.21 |
|  | Compressive strength (MPa) | 8.8 | 7.1 | 6.8 | 6.0 | 9.1 | 2.2 | 16.0 | 8.5 | 6.4 |
| Evaluation of sheet | Thermal conductivity (W/(m × K)) | 0.031 | 0.026 | 0.033 | 0.034 | 0.059 | 0.027 | 0.080 | 0.067 | 0.035 |
|  | Thickness change rate under high temperature environment ΔT(%) | 2.2 | 2.0 | 1.5 | 3.0 | 7.1 | 1.8 | 2.0 | 28 | 35 |

5. Consideration

Hereinafter, the evaluation results of the particles and the sheets will be examined with reference to Table 1.

According to Table 1, the particles of Comparative Example 1 have the number average particle diameter of 15 μm and the void ratio of 80%, and the amount of the volatile organic compound contained in the particles is 2.3% by mass.

For the particles of Comparative Examples 1, the compressive strength is as low as 2.2 MPa, although the particles are composed of the resin in which the content ratio of the crosslinkable monomer unit is large. As shown by this comparative example, since the particles having a number average particle diameter of more than 9.0 μm are less likely to obtain high compressive strength, the particles are disadvantageous in that they are likely to be crushed when, for example, they are processed into a sheet, etc.

According to Table 1, the particles of Comparative Example 2 have the number average particle diameter of 2.9 μm and the void ratio of 63%, and the amount of the volatile organic compound contained in the particles is 3.8% by mass.

For the particles of Comparative Example 2, the thermal conductivity is as high as 0.080 (W/(m×K)). As shown by this comparative example, since the thermal conductivity of the particles having a void ratio of less than 70% is too high, the particles have poor heat insulating properties.

According to Table 1, the particles of Comparative Example 3 have the number average particle diameter of 1.8 μm and the void ratio of 74%, and the amount of the volatile organic compound contained in the particles is 20.2% by mass.

For the particles of Comparative Example 3, the thermal conductivity is as high as 0.067 (W/(m×K)), and the thickness change rate ΔT under the high temperature environment is as high as 28%. As shown by this comparative example, for the particles that the amount of the volatile organic compound contained is more than 5% by mass, since the volatile organic compound contained in the particles (such as hexane) functions as a heating medium, the thermal conductivity of the particles increases too much and, as a result, the particles are in poor heat insulating properties. In addition, since the particles are likely to deform under the high temperature environment, they are poor in heat resistance.

According to Table 1, the particles of Comparative Example 4 have the number average particle diameter of 12.0 μm and the void ratio of 86%, and the amount of the volatile organic compound contained in the particles is 12.0% by mass.

For the particles of Comparative Example 4, the thermal conductivity is as high as 0.035 (W/(m×K)), and the thickness change rate ΔT under the high temperature environment is as high as 35%. As shown by this comparative example, for the particles that the number average particle diameter is more than 9.0 μm and the amount of the volatile organic compound contained is more than 5% by mass, since the particles are likely to deform under the high temperature environment, they are poor in heat resistance. While the content of the volatile organic compound in Comparative Example 4 (12.0% by mass) is lower than Comparative Example 3 (20.2% by mass), the heat resistance of the particles of Comparative Example 4 was worse than Comparative Example 3, since the particles of Comparative Example 4 contain the nitrile group-containing monomer unit.

On the other hand, according to Table 1, the particles of Examples 1 to 5 have the number average particle diameter of from 0.9 μm to 9.0 μm and the void ratio of from 74% to 90%, and the amount of the volatile organic compound contained in the particles is from 0.8% by mass to 3.0% by mass.

For these hollow resin particles, the compressive strength is as high as 6.0 MPa or more, the thermal conductivity of the sheet is as low as 0.059 (W/(m×K)) or less, and the thickness change rate ΔT of the sheet under high temperature environment is as low as 7.1% or less.

Therefore, it has been proven that hollow resin particles, which have one hollow portion respectively, and have the number average particle diameter of from 0.1 μm to 9.0 μm and the void ratio of from 70% to 99%, and in which the amount of the volatile organic compound contained is 5% by mass or less, have higher compressive strength, and exhibit more excellent heat insulating properties and heat resistance compared to conventional particles.

Reference Symbols List

1 Aqueous medium
2 Low polarity material
3 Surfactant
4 Monomer composition
4a Monomer dispersed in aqueous medium
5 Oil-soluble polymerization initiator
6 Shell
7 Hydrocarbon solvent
8 Hollow portion
8 Micelle
10 Hollow resin particle precursor
11 Test sheet
D0 and D1 to D8 Measuring point on test sheet
51 Aqueous medium
52 Surfactant
53 Monomer composition
53a Monomer dissolved out to aqueous medium
54 Water-soluble polymerization initiator
60 Micelle
60a Micelle precursor
100 Hollow resin particle

The invention claimed is:

1. Hollow resin particles each having one or two or more hollow portions,
wherein a number average particle diameter is from 0.1 μm to 9.0 μm, a void ratio is from 70% to 99%, and an amount of the volatile organic compound contained is 5% by mass or less,
wherein a repeating unit constituting the resin contains a crosslinkable monomer unit, and
wherein, with respect to 100 parts by mass of a total mass of the repeating unit constituting the resin, a content ratio of the crosslinkable monomer unit is from 25 parts by mass to 59 parts by mass.

2. The hollow resin particles according to claim 1, wherein a repeating unit constituting the resin contains a hydrophilic monomer unit.

3. The hollow resin particles according to claim 2, wherein the hydrophilic monomer unit contains at least one selected from the group consisting of a carboxyl group-containing monomer unit and a hydroxyl group-containing monomer unit.

4. The hollow resin particles according to claim 1, wherein a repeating unit constituting the resin contains a crosslinkable monomer unit, and the crosslinkable monomer unit contains at least one selected from the group consisting of a divinylbenzene monomer unit and an ethylene glycol dimethacrylate monomer unit.

5. The hollow resin particles according to claim 1, wherein a repeating unit constituting the resin contains a monovinyl monomer unit.

6. The hollow resin particles according to claim 1, wherein a particle size distribution (a volume average particle diameter (Dv)/a number average particle diameter (Dn)) is from 1.1 to 2.5.

7. The hollow resin particles according to claim 1, wherein the hollow resin fine particles each comprise a shell, and shell thickness is from 0.01 μm to 1.0 μm.

8. Hollow resin particles for thermosensitive recording materials, the particles having the features defined in claim 1.

9. Hollow resin particles for fillers, the particles having the features defined in claim 1.

10. Hollow resin particles for coating materials, the particles having the features defined in claim 1.

11. A sheet comprising the hollow resin particles defined in claim 1.

12. A thermosensitive recording sheet having the features defined in claim 11.

* * * * *